July 23, 1940.  R. BERGERIOUX  2,208,744

CONTAINER PROVIDED WITH A FLEXIBLE DIAPHRAGM FOR DISPENSING MATERIALS

Filed Sept. 15, 1937  4 Sheets-Sheet 1

Inventor
R. Bergerioux
By John O. Seifert
Atty.

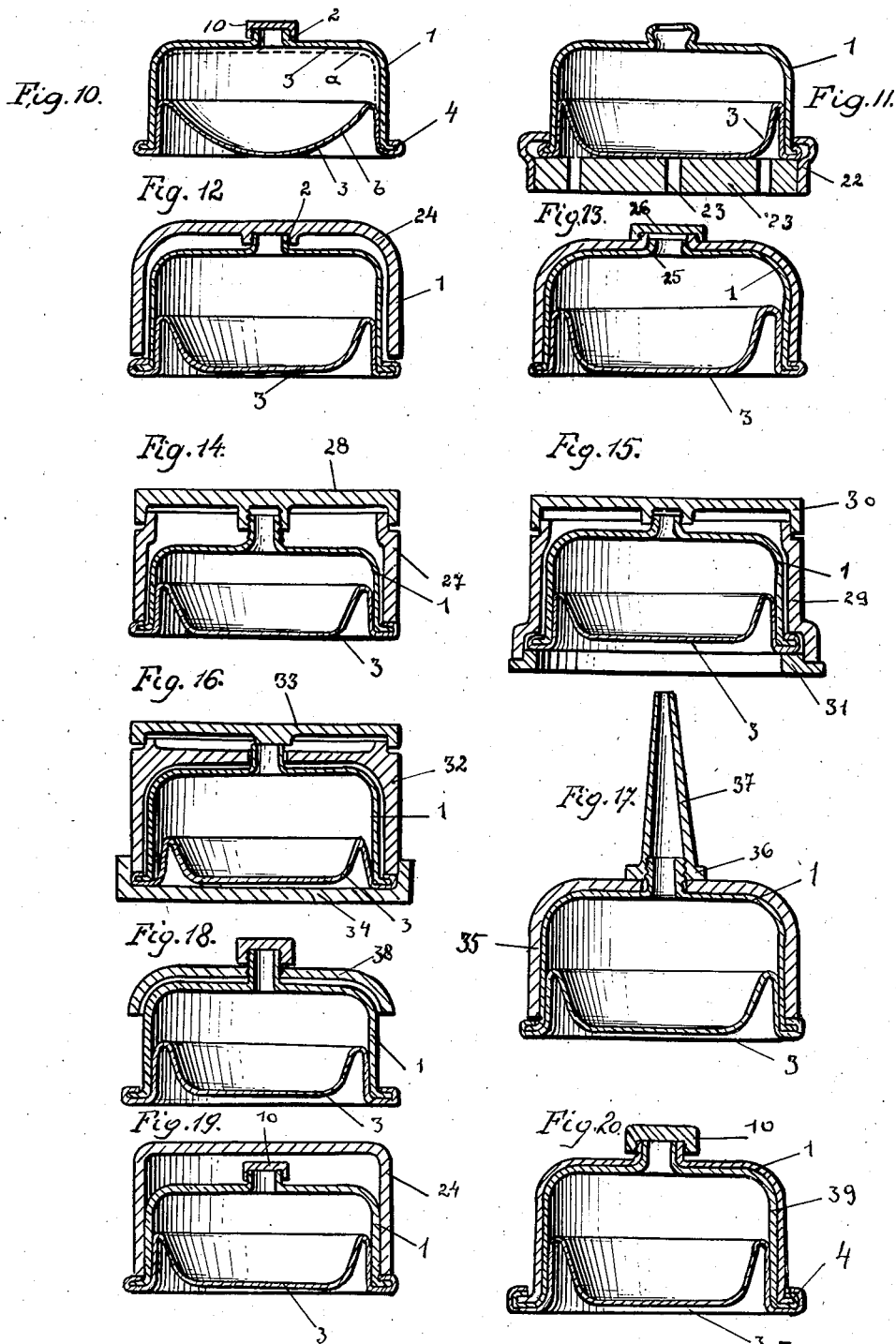

July 23, 1940.  R. BERGERIOUX  2,208,744
CONTAINER PROVIDED WITH A FLEXIBLE DIAPHRAGM FOR DISPENSING MATERIALS
Filed Sept. 15, 1937  4 Sheets-Sheet 4
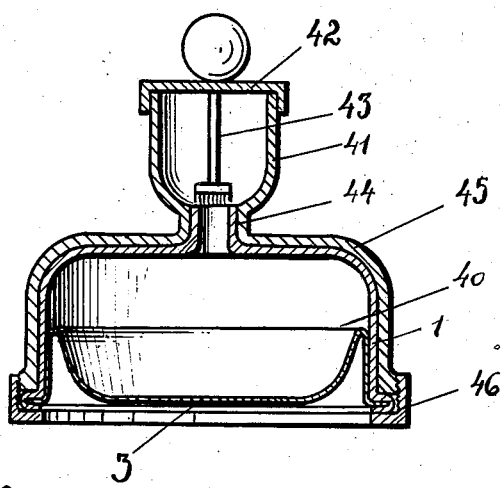
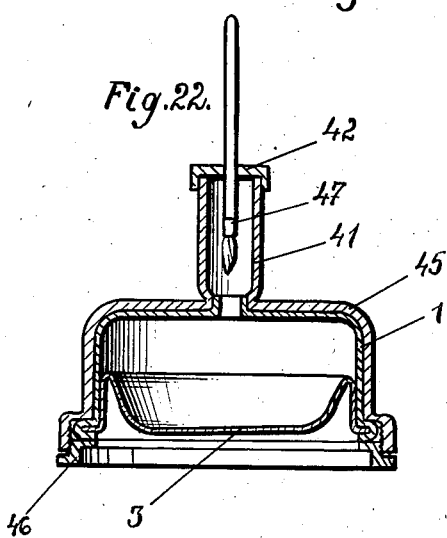 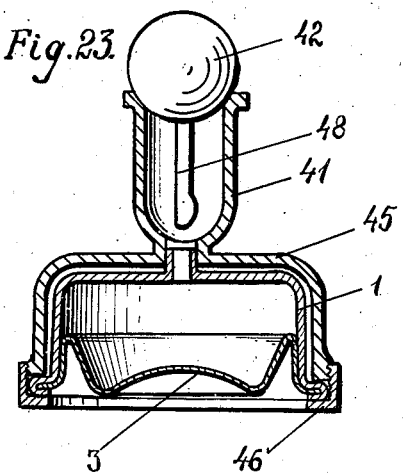
Inventor
R. Bergerioux
BY John O. Seifert
Atty.

Patented July 23, 1940

2,208,744

UNITED STATES PATENT OFFICE 2,208,744

CONTAINER PROVIDED WITH A FLEXIBLE DIAPHRAGM FOR DISPENSING MATERIALS

René Bergerioux, Mennecy, France, assignor to Georges Bardin, Tournus (Saone-et-Loire), France Application September 15, 1937, Serial No. 163,999
In France September 30, 1936

7 Claims. (Cl. 221—60)

Containers for dispensing materials and which comprise a permanent portion and a deformable flexible diaphragm are already known. Containers for dispensing materials are likewise known and of which the diaphragm, when the container is full, is protected by a skirt forming an extension of the difficulties of assembling same, both as regards cost of production and utilization, rendering them of small practical value.

The present invention relates to a container for dispensing materials having a permanent portion and a deformable flexible diaphragm, which are assembled at their base by crimping, soldering or any other appropriate means, the diaphragm being entirely or partially protected by the permanent wall.

The diaphragm is formed either by successive stampings before assembly, or by means of a liquid or pneumatic agent after a first stamping and assembling, or during the filling under pressure with the product to be dispensed, using a die or without a die by introducing a predetermined quantity of the product.

The dispensing container according to the present invention has numerous advantages: thus the body of the container, of which the diaphragm is protected, only has two elements which can be assembled by crimping enabling both a very low cost of production to be obtained and the delivery to be effected to the consumer of a full, liquid-tight inviolable container which is ready for use.

On the other hand, the thickness of the wall of the permanent portion can be reduced, the point of assembly of the two parts no longer having to support excessive pressures during the filling of the container under pressure, or to be deformed during the emptying.

The accompanying drawings show by way of example several embodiments of the invention.

Figs. 1, 2, 5, and 11 show containers formed by means of a die;

Fig. 10 shows a container formed without a die;

Figs. 12 to 19 show different constructions of containers provided with a cover forming a stopper;

Fig. 20 shows a dispensing container of which the permanent portion is lined with a thin wall;

Figs. 21 to 23 show the application of the container as a refill cartridge.

The container comprises a rigid or relatively rigid permanent portion 1, having a nozzle 2 and a deformable diaphragm 3 connected at 4 by crimping or any other means to the rigid portion near its base.

The deformable diaphragm can be formed by various methods.

According to a first method, the manufacture of the diaphragm is effected in three successive stages: firstly, a blank is transformed by stamping into a shape $a$, corresponding to that of the inner wall of the permanent portion and the diaphragm is then brought, by means of an appropriate tool, to its final form $b$ and finally, the diaphragm is secured to the rigid portion by crimping. To make the contents of the container come out of the nozzle, it suffices to press with a finger on the diaphragm which will progressively take up the shape of the inner wall of the permanent portion.

According to a second method of manufacture the diaphragm is assembled with the rigid portion after the first stage, that is to say, in the shape $a$, and it receives its final shape after assembly by pressing it by means of a liquid or pneumatic agent against a die or a plane surface. The filling can be effected by means of a resilient nipple 5.

Figure 1:
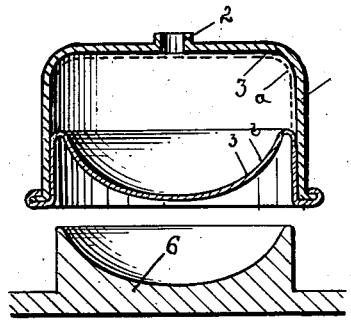

According to a third method of manufacture which is generally preferable, the diaphragm which is assembled to the permanent portion in the shape $a$, obtains its final form during the filling under pressure of the container with the product to be dispensed; of course, the filling is effected in the presence of a die 6 or 7 of a plane surface 8, a fact which in the case of a die such as described in Fig. 1 has the advantage of avoiding the pressure of the product attaining the point of assembly 4 of the two parts, thereby preventing dangerous pressures from breaking the assembly.

Figure 2:
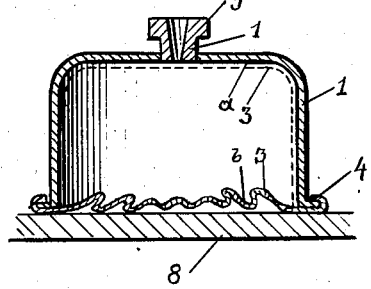
Figure 5:
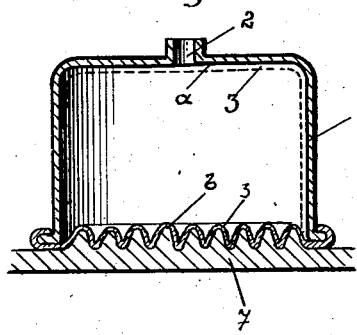

The die can have a concave shape such as that shown at 6 in Fig. 1 or it can have concentric grooves 7 (Fig. 5), so that the diaphragm is transformed by the pressure into a bellows having concentric elements. By using as an abutment a simple plane surface 8, such as shown in Fig. 2, irregular wrinkles are obtained, but which have a concentric tendency.

Figure 3:
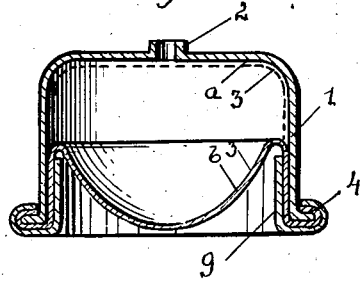
Fig. 3 shows a container provided with rigid inner socket.

To avoid the use of a die, the diaphragm can be held, up to a certain height, against the inner wall of the permanent portion by means of a rigid socket 9, which is secured by crimping to the permanent portion according to the construction illustrated in Fig. 3, but it can be held by clamping, cementing or any other appropriate means.

Figure 4:
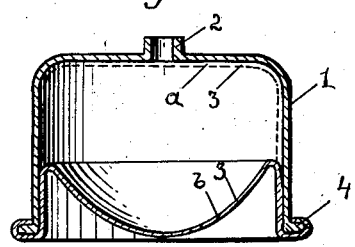
Fig. 4 shows a container of which the diaphragm has a rigid lower part.

According to the embodiment shown in Fig. 4, it is the diaphragm itself which has a greater rigidity in its lower part 10, thereby avoiding the use of a socket.

The shape given to the deformable flexible diaphragm in their position b can obviously be of any kind, provided that the diaphragm is located in the interior of the permanent portion. It is necessary that after the emptying of the container, which is effected by pressure on the said diaphragm, the latter when pushed in or straightened out can take up the inner shape of the permanent portion.

Figure 6:
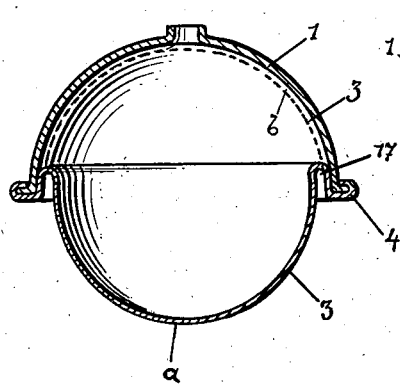
Figs. 6 and 7 show containers of which the diaphragm is partially protected by the permanent portion.
Figure 7:
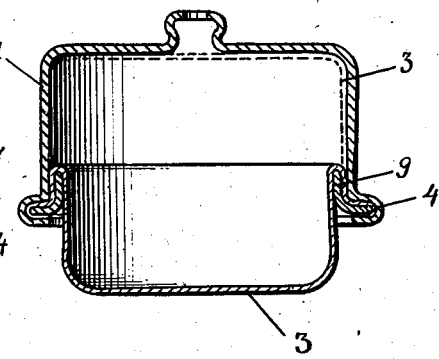

Figs. 6 and 7 show containers of which the diaphragm is partially protected by the permanent wall 1.

This embodiment has the advantage of a greater useful volume, while affording protection to the most sensitive part of the diaphragm. Furthermore, the crimping ring does not have to support excessive pressures during the filling operation, or undergo deformation during emptying, the transition from the initial position into the final position b being effected progressively.

This embodiment can be obtained in various manners.

According to a first method, the diaphragm, which is arranged before filling against the permanent wall, is pushed out by the pressure of the product introduced through the nozzle and the filling is stopped in the desired position of the diaphragm.

Figure 8:
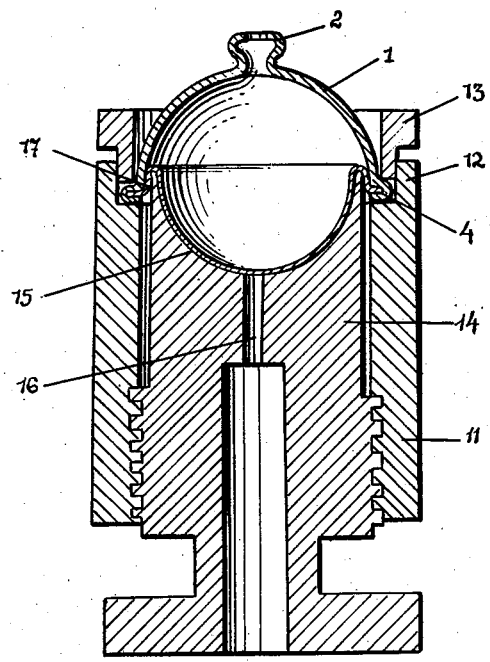
Figs. 8 and 9 show tools for forming said containers.

This method has the drawback that the shape obtained is not always regular and that the amount of the product introduced has to be carefully controlled. It is more advantageous to utilize a socket 9 which fits into the permanent portion below the diaphragm. The socket can be fixed by repeated crimping or again, as shown in Fig. 7, it can be secured to an annular flange which is engaged in the crimping ring 4 of the container. To avoid the use of the socket, a forming tool such as shown in Fig. 8 can be used.

Said tool comprises a cylindrical support 11 having a shoulder 12 in which is arranged the crimping ring 4 of the container. A clamping ring 13 holds the ring 4 in the shoulder by means of an appropriate device. Inside the support is a movable mandrel 14 of which the upper part is shaped as an appropriate die 15 and which can be adjusted for height, for example, by screwing. An opening 16 enables the air, which is between the diaphragm and the mandrel 14 to escape. By modifying the depth of the fold 17 by means of the height adjustment of the mandrel, the useful volume of the container can be changed.

Figure 9:
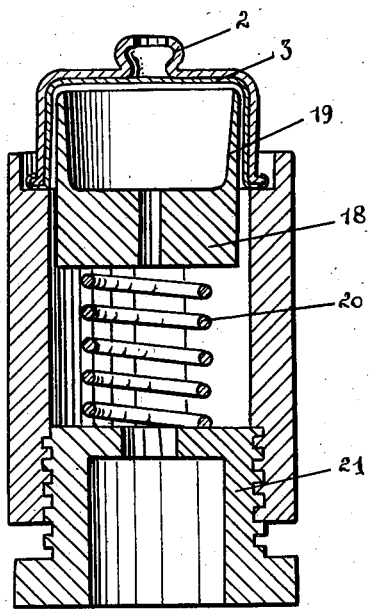

Fig. 9 shows a modified embodiment of the forming tool for cylindrical containers. The sliding die 18 of said tool has a cylindrical ring 19 of the same height as the diaphragm 3. The mandrel 18 bears against a spring 20 which in its turn rests on an abutment 21 of which the position in height can be adjusted by screwing.

At the beginning of the filling operation, the die is in the position shown in Fig. 9 and it is progressively pushed out by the diaphragm 3 during filling. The spring 20 must be chosen in such a manner that its resistance can be readily overcome by the pressure of the product introduced into the container through the nozzle 2.

When using this device, the diaphragm is supported by the ring 19 of the die during the whole of the filling operation; it is therefore pushed out progressively.

Said forming tool can be usefully employed during the filling of the containers of which the diaphragm is entirely protected by the permanent portion.

According to another method of manufacture the deformable diaphragm is arranged against the permanent wall, as shown at a in Fig. 10 and its final shape b is obtained by introducing under pressure through the nozzle 2 a predetermined amount of the product. During the filling under pressure, it is the central portion of the diaphragm which is pushed back by the product and if the filling is stopped in time, an annular portion of the diaphragm remains in the position a.

The carrying out of this method requires a certain accuracy and furthermore the diaphragm thus obtained is more or less misshapen; it will therefore generally be more advantageous to position and fix the container by an appropriate means during the filling on a plane surface, as shown in Fig. 11. Said plane surface or abutment 22 should be provided with holes 23 to enable the air which is between the diaphragm and the abutment to escape. To obtain by means of this device the desired shape of the diaphragm, it suffices to prevent the filling pressure exceeding a certain limit. It is possible, with this method, to stamp a mark, etc., on the edge of the diaphragm by using the abutment as a die. It is obvious that this shape of the diaphragm could also be obtained by suction of its central portion towards a plane surface or towards any appropriate die.

Fig. 12 shows a container provided with a cover 24 forming a stopper which acts as a case, which is made of plastic material, metal, etc. It is held in position by merely clamping, or by ribs, screws, bayonet closure, etc., provided either on the container or on the cover or on the nozzle of the container.

The case illustrated in Fig. 13 is provided with a nozzle 25 having a stopper 26.

The case illustrated in Fig. 14 comprises two parts: a cylindrical body 27 and a cover 28, secured together with any appropriate means.

Fig. 15 shows a case having a cylindrical body 29, a cover 30 forming a stopper, and a collar 31 secured thereto which maintains the container in the case.

Fig. 16 shows a case comprising a case body 32, a cover 33 having a stopper and a bottom cover 34 completely enclosing the container.

According to the embodiment shown in Fig. 17, the casing cover 35 is fixed on the container by means of a clamping ring 36 which is screwed on the nozzle of the container. Said clamping ring can be replaced as shown in dotted lines, by an oil can nozzle 37.

Fig. 18 shows a container provided with a cover 38 which is fixed on the nozzle and only protects the top of the container.

Fig. 19 shows a container provided with a stopper fixed on the nozzle, the container and the stopper being protected by an outer case 24.

Fig. 20 shows a dispensing container of which the permanent portion is lined. This embodiment permits of the use of a cheap outer wall 1 made of tin-plate for example, ensuring the rigidity of the container, and of a very thin inner wall 39 made of another metal which withstands the corrosion of the contents; aluminium, tin, for example.

Fig. 21 shows the use of a dispensing container as a refill cartridge of a reservoir container, comprising a container 41 provided with a cover 42, secured to a brush 43. The container 41 is connected by the orifice 44 to the reservoir 45 in which the cartridge 40 is fixed by means of a clamping ring 46.

The method of using this apparatus is as follows:

When the cartridge 40 has been arranged in the reservoir 45 it suffices to exert a pressure on its diaphragm 3 to cause a certain amount of the product to pass into the container 41 whence it is taken up by means of the brush 43. The embodiment illustrated in this figure is intended to contain paste.

Fig. 22 shows a container for paints, and of which the cover 42 is secured to a brush 47 provided with a long handle extending beyond the cover.

The apparatus illustrated in Fig. 23 is intended for mustard; its cover 42, of spherical shape, is secured to a spoon 48.

What I claim as new and desire to procure by Letters Patent is:

1. A container for dispensing materials comprising a permanent shell having a discharge nozzle and a deformable diaphragm the marginal portion of which is connected to the edge of the shell and at least a part of the peripheral portion of said diaphragm being permanently juxtaposed to the inner surface of the permanent shell.

2. A container for dispensing materials comprising a permanent shell having a discharge nozzle and a deformable diaphragm entirely within the shell, the marginal portion of said diaphragm being connected to the edge of the shell and at least a part of the peripheral portion of said diaphragm being permanently juxtaposed to the inner surface of the permanent shell.

3. A container for dispensing materials comprising a permanent shell having a discharge nozzle and a deformable diaphragm connected to the edge of the shell, at least a part of the peripheral portion of said diaphragm being permanently juxtaposed to the inner surface of the permanent shell and means for holding the permanently juxtaposed portion of the diaphragm within the shell.

4. A container for dispensing material comprising a permanent shell having a discharge opening and a deformable diaphragm connected to the edge of the shell at least a part of the peripheral portion of said diaphragm being permanently juxtaposed to the inner surface of the permanent shell and a ring for holding the permanently juxtaposed portion of the diaphragm within the shell.

5. A container for dispensing material comprising a permanent shell having a discharge opening and a deformable diaphragm connected to the edge of the shell at least a part of the peripheral portion of said diaphragm being permanently juxtaposed to the inner surface of the permanent shell and a ring for holding the permanently juxtaposed portion of the diaphragm within the shell, said ring having an outwardly extending flange in contact with the edge of the shell.

6. A container for dispensing material comprising a permanent shell having a discharge nozzle in the top thereof and a deformable diaphragm connected to the edge of the shell, said deformable diaphragm having a convex central portion and a circular kink between said convex portion and the edge portion jointed to the edge portion of the permanent shell, said diaphragm being disposed entirely within said shell, and a casing secured to the discharge nozzle enclosing the permanent shell.

7. A container for dispensing material, comprising a permanent shell having a discharge opening in the top thereof, a deformable diaphragm connected to the edge of the shell and having a portion extending upwardly within the shell adjacent to the inner face of the shell, there being an outwardly extending bead formed at the joint between the permanent shell and the deformable diaphragm, and a casing for the container supported on said bead and extending over the shell and the discharge opening.

RENÉ BERGERIOUX.